March 15, 1955
J. PARKER ET AL
2,703,955
COTTON PICKER
Filed March 5, 1952
3 Sheets-Sheet 1
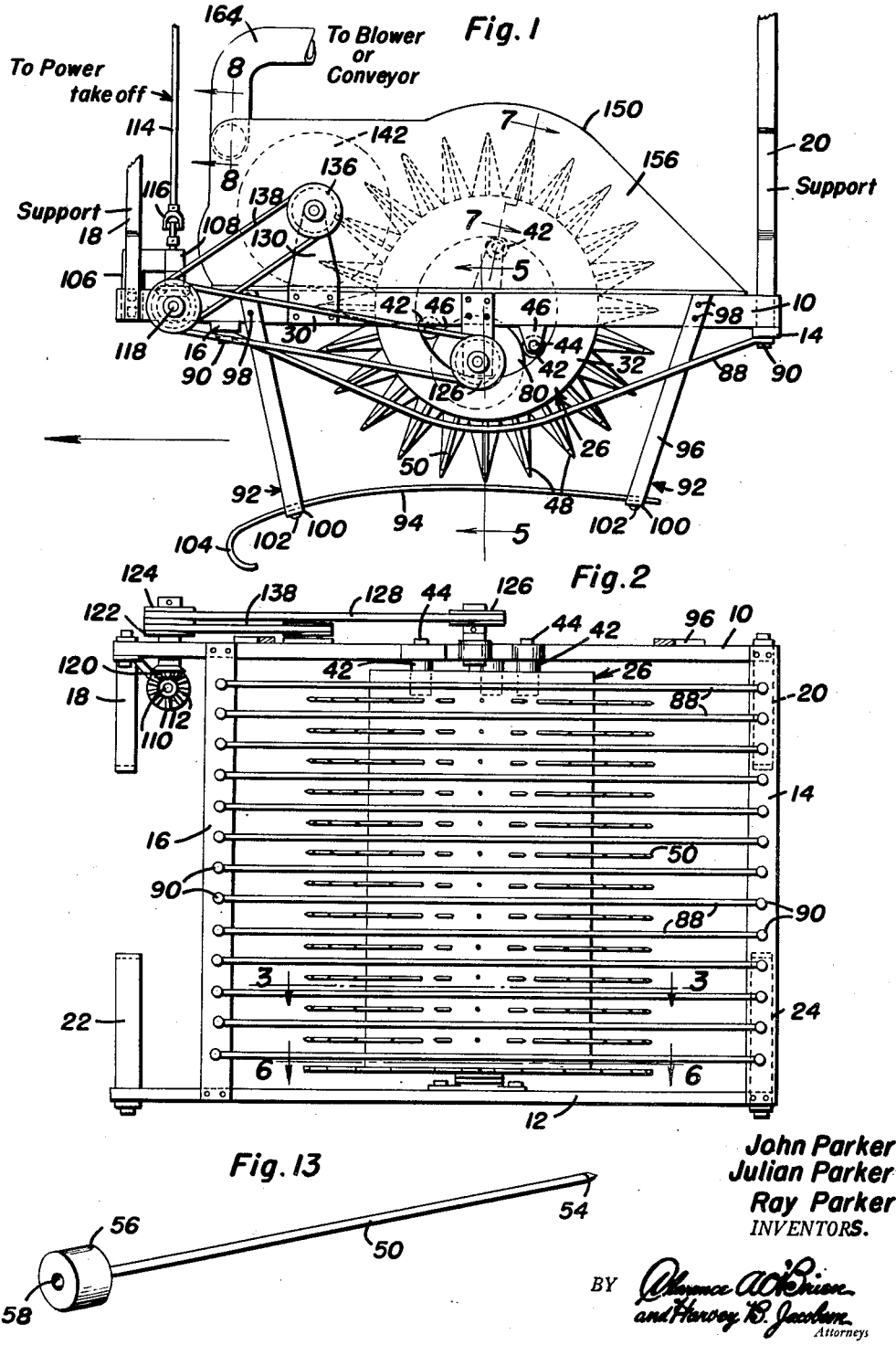
John Parker
Julian Parker
Ray Parker
INVENTORS.

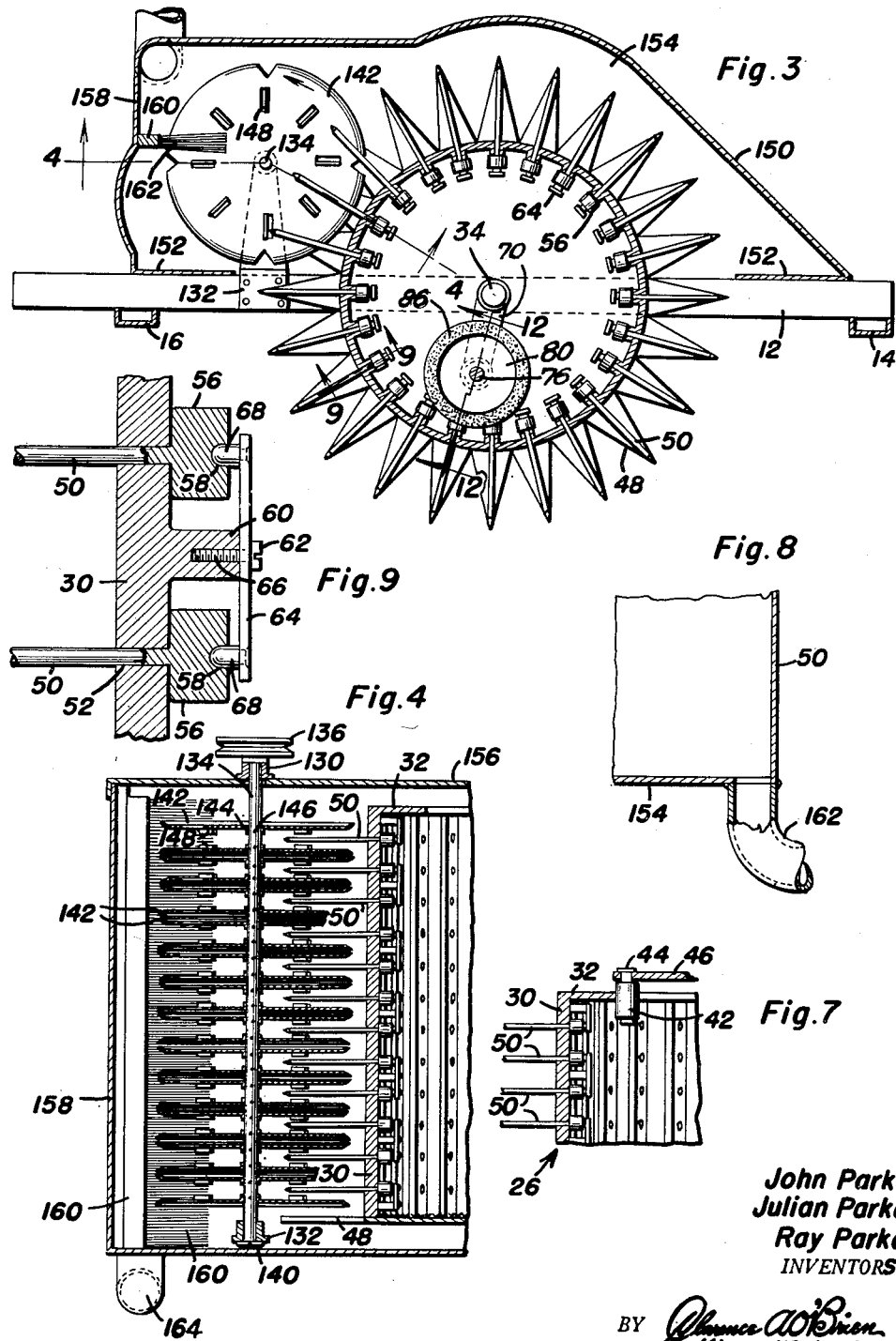

John Parker
Julian Parker
Ray Parker
INVENTORS.

2,703,955
COTTON PICKER

John Parker, Winnsboro, and Julian Parker and Ray Parker, Delhi, La.

Application March 5, 1952, Serial No. 274,856

3 Claims. (Cl. 56—44)

This invention relates in general to a cotton picker, and more specifically to an automatic type picker which is adapted to be mounted upon a tractor.

The primary object of this invention is to provide an improved cotton picker which may be conveniently mounted upon a conventional farm tractor and be powered by the power take-off of the tractor.

Another object of this invention is to provide an improved cotton picker which includes a rotating drum having a plurality of spindles thereon for removing cotton bolls from cotton plants, said drum having arms mounted at the bottom thereof for engagement with stalks of cotton plants as the drum moves forward in order to rotate same.

Another object of this invention is to provide an improved cotton picker having a plurality of spindles which engage ripe cotton bolls and are rotated in order to wrap the cotton bolls therearound and pull same off of the cotton plants.

Another object of this invention is to provide an improved cotton picker having means for engaging cotton plants and removing the cotton bolls therefrom, other means for engaging the first means for removing the cotton bolls therefrom and removing the same from the cotton picker.

Another object of this invention is to provide an improved cotton picker which is of simple construction and light in weight whereby as many as four such cotton pickers may be mounted on a large two row farm tractor.

Another object of this invention is to provide an improved cotton picker which is of simplified construction and is adapted to remove a large percentage of ripe cotton bolls from cotton plants whereby it may be economically manufactured and utilized.

A further object of this invention is to provide an improved cotton picker which will quickly and efficiently remove ripe cotton bolls from cotton plants without damaging the same.

With these objects definitely in view, this invention resides in certain novel features of construction, combination and arrangement of elements and portions as will be hereinafter described in detail in the specification, particularly pointed out in the appended claims, and illustrated in the accompanying drawings, which form a material part of this specification, and in which:

Figure 1 is a top plan view of the improved cotton picker, which is the subject of this invention, the supports for cotton picker being broken away and a tractor, on which the cotton picker is adapted to be mounted, not being shown;

Figure 2 is a side elevational view of the cotton picker of Figure 1 and showing the general construction of a guard for preventing cotton plants from becoming tangled with the drum of the cotton picker, the means for removing cotton bolls from the spindles being omitted;

Figure 3 is an enlarged transverse horizontal sectional view taken along the plane of section line 3—3 of Figure 2;

Figure 4 is an enlarged fragmentary transverse vertical sectional view taken substantially upon the plane indicated by the section line 4—4 of Figure 3 and showing the construction of the rotating disk for removing cotton bolls from the spindles carried by the drum;

Figure 7 is an enlarged fragmentary transverse vertical sectional view taken substantially upon the plane indicated by the section line 7—7 of Figure 1 and showing the construction of roller support means for the upper end of the drum of the cotton picker;

Figure 8 is an enlarged fragmentary transverse vertical sectional view taken substantially upon the plane indicated by the section line 8—8 of Figure 1 and showing the construction of an outlet on the cotton boll receiving hopper of the cotton picker;

Figure 9 is an enlarged fragmentary transverse vertical sectional view taken substantially upon the plane indicated by the section line 9—9 of Figure 3 and showing the manner in which the spindles are rotatably mounted and supported by the drum;

Figure 12:
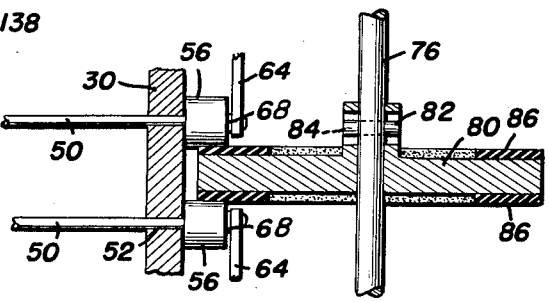

Figure 12 is an enlarged fragmentary transverse vertical sectional view taken substantially upon the plane indicated by the section line 12—12 of Figure 3 and showing the manner in which the spindles are driven by a rotating friction disk carried within the drum; and, Figure 13 is an enlarged perspective view of one of the spindles and showing the relationship of the friction disk engaged roller on the end thereof with respect to the remainder of the spindle.

Similar characters of reference designate similar or identical elements and portions throughout the specification and throughout the different views of the drawings.

Referring now to the drawings in detail and more particularly to Figures 1 and 2, it will be seen that the cotton picker, which is the subject of this invention, includes a frame. The frame includes a top horizontal main frame member 10 and a bottom horizontal main frame member 12 which are in vertical alignment and in spaced parallel relation. Extending between the rear ends of the top and bottom horizontal main frame members 10 and 12, respectively, and secured thereto is a rear frame member 14 which extends vertically. Also extending between the main horizontal frame members 10 and 12 is a second vertical frame member 16 which is secured to the main horizontal frame members adjacent the forward end thereof, the vertical frame member 16 being the forward frame member.

In order that the cotton picker and its frame be secured to a conventional tractor, a first support 18 is secured to the forward end of the top horizontal frame member 10. A similar support 20 is secured to the rear end of the top horizontal frame member 10 and the two supports 18 and 20 extend inwardly from the frame of the cotton picker and are adapted to be secured at their inner ends to a conventional tractor in any conventional manner. Secured to the bottom horizontal frame member 12 and extending inwardly from its front and rear ends are supports 22 and 24, respectively. It will be noted that the support members 18, 20, 22 and 24 are generally Z-shaped in elevation so as to provide parallel inwardly extending arms. The support members 22 and 24 may be secured to a tractor (not shown) in the same manner as which are secured the support members 18 and 20.

Figure 5:
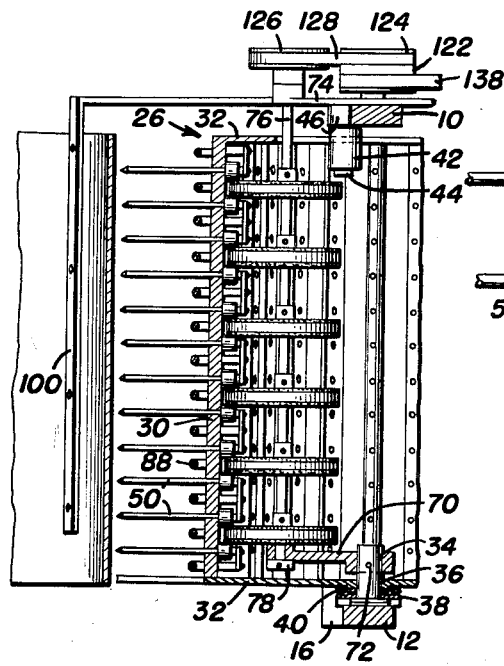
Figure 5 is an enlarged fragmentary transverse vertical sectional view taken substantially upon the plane indicated by the section line 5—5 of Figure 1 and showing the construction of the rotating friction disk for driving the spindles carried by the drum in order to have cotton bolls engaged thereon.

Extended between and secured to the central portions of the horizontal frame members 10 and 12 is a revolving drum 26. As is best illustrated in Figure 5, the drum 26 includes a cylindrical main portion 30 which extends vertically between the horizontal frame members 10 and 12 and has an inturned annular flange 32 at the upper end thereof. The cylindrical main portion 30 also has a circular bottom plate 32 which encloses the lower end thereof. The revolving drum 26 is mounted on the frame of the cotton picker by a supporting spindle 34 extending upwardly from the bottom main frame member 12 and passing through an opening 36 located centrally of the bottom plate 32. Carried by the supporting spindle 34 is a thrust bearing 38 which supports the weight of the revolving drum 26 and bears against a boss 40 on the under side of the bottom plate 32.

The upper end of the revolving drum 26 is guidingly supported by three equally spaced rollers 42 rotatably mounted on spindles 44 secured to mounting arms 46 carried by the top main frame member 10. The rollers 42 engage the inner edge of the annular flange 32 carried at the top of the revolving drum 26 and maintains the drum in vertical relation with respect to the spindle 34.

Figure 6:
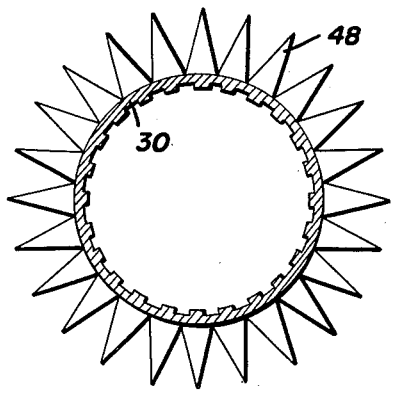
Figure 6 is a transverse horizontal sectional view taken substantially upon the plane indicated by the section line 6—6 of Figure 2.
Figure 10:
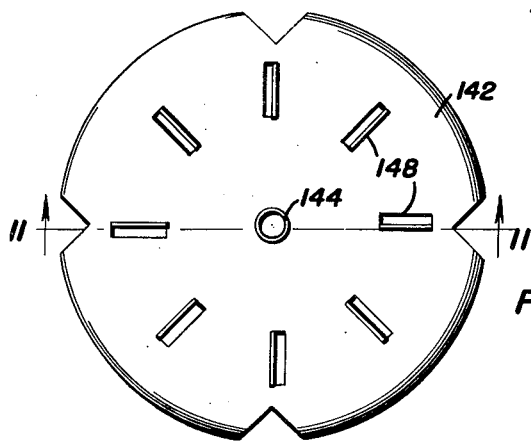
Figure 10 is an enlarged plan view of one of the rotating disks for removing cotton bolls from the spindles and shows the manner in which cotton boll engaging fingers are struck therefrom.
Figure 11:
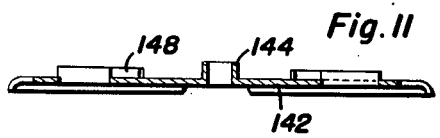
Figure 11 is an enlarged transverse vertical sectional view taken substantially upon the plane indicated by the section line 11—11 of Figure 10 and showing the construction of one of the rotating disks for removing cotton bolls from the spindles.

Referring now to Figure 6 in particular, it will be seen that mounted at the bottom of the cylindrical portion 30 of the revolving drum 26 are a plurality of equally spaced radially extending arms 48. The arms 48 are generally triangular in shape with one side thereof secured to the cylindrical body portion 30 and are identical in shape. It is the intent of the cotton picker that the arms 48 engage stalks of cotton plants as the cotton picker is moved down a row of cotton plants and revolve the revolving drum 26 at a rate directly proportional to the spacing of the cotton plants.

In order that cotton bolls may be picked from the cotton plants as the drum 26 revolves, the cylindrical body portion thereof is provided with a plurality of cotton boll engaging spindles 50 arranged in horizontal rings as shown. Referring to Figures 9, 12 and 13 in particular, it will be seen that the cylindrical body portion 30 of the revolving drum 26 is provided with a plurality of bores 52 extending axially therethrough. Rotatably mounted in each bore 52 is a spindle 50 which has a pointed outer end 54 and a roller 56 on the inner end thereof. The roller 56 is provided with a centrally located bore 58 in the inner end thereof. In order that the spindles 50 may be secured in place in the bores 52, the inner side of the cylindrical body portion 30 is provided with a plurality of spaced projections 60 disposed between vertical pairs of spindles 50. Carried by each projection 60 and secured thereto by a bolt 62 is a securing plate 64. The bolt 62 is threadedly engaged within a threaded bore 66 and the projection 60 and the securing plate 64 has outwardly extending pins 68 mounted within the bores 58 in the ends of the lower portions 56 of the spindles.

Referring now to Figures 5 and 12 in particular, it will be seen that rigidly secured to the supporting spindle 34 within the revolving drum 26 is a bottom support arm 70. The support arm 70 is secured in position on the spindle 34 by a pin 72. In vertical alignment with the bottom support arm 70 is a top support arm 74 which is secured to the top horizontal frame member 10. The support arms 70 and 74 have aligned bores in which is received a rotating shaft 76. The lower end of the rotating shaft 76 is provided with a collar 78 pinned thereto for positioning the shaft with respect to the bottom support arm 70. Rigidly secured to the revolving shaft 76 are a plurality of revolving discs 80. Each revolving disc 80 is provided with a centrally located bore 82 projecting therefrom and secured to the revolving shaft 76 by a pin 84. The outer portion of the upper and lower surfaces of each revolving disc 80 is provided with a friction surface 86 which engages the roller portions 56 of a pair of vertically adjacent spindles 50 and rotates same when the revolving disc 80 rotates. The rotating disc 80 is formed of a resilient material such as rubber. The manner in which the revolving shaft 76 and the rotating discs 80 are rotated will be explained in more detail hereinafter. In order that cotton plants (not shown) will not become entangled with the rotating drum 26, a guard is mounted around the drum and extends outwardly thereof. The guard consists of a plurality of vertically spaced curved guard rails 88 which extend between and are secured to the vertical front and rear frame members 16 and 14, respectively. The ends of the guard members 88 are provided with special fittings 90 which secure them to the vertical frame members.

Carried by the top horizontal main frame member 10 are a pair of outwardly extending support members 92 which support a guide shield 94 in spaced relation to the guard members 88. The support members 92 are identical and each has a horizontal portion 96 which is secured to the top surface of the horizontal frame member 10 by fasteners 98 and a downwardly extending vertical portion 100 which is secured to the outer side of the guide shield 94 by a plurality of fasteners 102. It will be noted that the guide shield 94 has a reversely curved forward end 104 which is widely spaced from the guard members 88 and that the guide shield 94 curves inwardly towards the outer portion of the guard members 88 and is spaced closely adjacent the arms 48 carried by the revolving drum 26. It is intended that the guide shield 94 engage rows of cotton plants and guide them towards the revolving drum 26 and the spindles 50 carried thereby.

Referring now to Figures 1 and 2 in particular, it will be seen that carried by the top horizontal frame member 10 adjacent the forward end thereof is a support arm 106 which has a journal portion 108. Rotatably mounted within the journal portion 108 is a drive shaft 110 having a bevel gear 112 on the outer end thereof. The inner end of the drive shaft 110 is connected to a second drive shaft 114 by a universal coupling 116. The inner drive shaft 114 is intended to be connected to a power takeoff of a tractor. Carried by the top horizontal frame member 10 in alignment with the bevel gear 112 is a shaft 118 which extends vertically through the top horizontal frame 10 and has a bevel gear 120 in engagement with bevel gear 112. Secured on the shaft 118 are a bottom pulley 122 and a top pulley 124. The top pulley 124 is in horizontal alignment with a pulley 126 carried by the rotating shaft 76 and is connected thereto by a drive belt 128 entrained thereover.

It will be seen that when the cotton picker is moved forward and the shaft 76 is rotated by the drive means described above, the drum 26 will revolve due to the engagement of the arms 48 with the cotton plant stalks and the spindles 50 will rotate due to their engagement with the rotating discs 80. As cotton plants are guided into engagement with the guard members 88 the rotating spindles, which are mounted in both horizontal and vertical rows, the vertical rows being in alignment with the arms 48, will engage ripe cotton bolls (not shown), and the bolls will be engaged on the pointed end 54 thereof and twirl thereabout. Due to the twirling motion of the spindles 50, the cotton bolls will be pulled from their respective cotton plants and retained upon the spindles 50.

Referring now to Figures 1, 3 and 4 particularly, it will be seen that extending inwardly from the top and bottom horizontal frame members 10 and 12 are support arms 130, 132, respectively. Extending between and rotatably journaled in the ends of the support members 130 and 132 is a shaft 134. The shaft 134 has a pulley 136 mounted on the upper end thereof which is connected to the pulley 122 by a drive belt 138 entrained thereover. The shaft 134 is retained within the bottom support arm 132 by a collar 140. Secured to the shaft 134 in pairs are a plurality of metal discs 142 which are generally circular in plane view. Each metal disc 142 is provided with a centrally located boss 144 which is secured to the shaft 134 by a pin 146. Each pair of metal discs 142 are mounted in space relation and are adapted to have passed therebetween a horizontal row of spindles 50. In order to remove the cotton bolls from the spindles 50, each metal disc 142 is provided with struck-out fingers 148. It will be understood that the fingers 148 of the metal disc 142 of each pair of discs are in opposed aligned relation.

Referring now to Figures 1 and 3 in particular, it will be seen that the cotton picker is provided with an enlarged housing 150 which encloses the inner portion of the cotton picker. The housing 150 has longitudinally extending flange portions 152 on the outer edges thereof which extend between the top and bottom horizontal frame members 10 and 12 and are secured thereto in order to support the housing 150 therefrom. It will be understood that the housing 150 also has a bottom portion 154 and a top portion 156. The housing 150 not only encloses the inner portion of the cotton picker but also forms a receptacle for the cotton bolls picked by the spindles 50.

Mounted within the housing 150 and carried by the forward wall 158 thereof is a vertically extending support member 160. The vertically extending support member 160 is provided with a plurality of spring fingers 162 which engage between the metal disc 142 and remove cotton bolls therefrom which the discs have removed from the spindles 50. After the cotton bolls have been removed from the metal disc 142 by the spring fingers 160 they drop down into a hopper including the bottom wall 154 of the housing 150 and pass into an outlet 164. The outlet 164 may be connected to any conventional means for removing the picked cotton including a blower or conveyor means.

While the exact manner in which the cotton picker is to be mounted upon the tractor has not been illustrated, it will be understood that the cotton picker may be mounted on the tractor in any conventional manner and at least one picker may be mounted on each side of a tractor. Also, in the case of a large two row tractor, as many as four of the cotton pickers may be mounted on a single tractor.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. In a cotton picker, a frame, a drum rotatably mounted on said frame, said drum having one end open, a plurality of circumferentially spaced arms secured to said drum and projecting radially therefrom to engage stalks of cotton plants and rotate said drum as the frame is moved along the ground, a ring of circumferentially spaced, radially projecting spindles rotatably carried by said drum, said spindles including roller portions disposed within said drum, a power operated shaft rotatably carried by said frame and projecting longitudinally into said drum through the open end thereof, a disk rigid with said shaft and having one face thereof in driving contact with at least one of said roller portions to rotate the same as said drum is rotated whereby the spindles will be successively rotated as the drum is rotated.

2. In a cotton picker, a frame, a drum rotatably mounted on said frame, said drum having one end open, means for rotating said drum as the frame is moved along the ground, a ring of circumferentially spaced, radially projecting spindles rotatably carried by said drum, said spindles including roller portions disposed within said drum, a power operated shaft rotatably carried by said frame and projecting into said drum through the open end thereof and being disposed in offset parallelism with the rotational axis of the drum, a disk rigid with said shaft and having one face thereof in driving contact with at least one of said roller portions to rotate the same as said drum is rotated, whereby the spindles will be successively rotated as the drum is rotated.

3. In a cotton picker, a frame, a drum rotatably mounted on said frame, said drum having one end open, means for rotating said drum as the frame is moved along the ground, a plurality of rings of circumferentially spaced, radially projecting spindles rotatably carried by said drum, said spindles including enlarged roller portions disposed within said drum, securing straps secured to the inner surface of said drum and overlying alternate adjacent pairs of said roller portions, retaining said spindles in operative position with respect to said drum, a shaft rotatably carried by said frame and projecting into said drum, and being disposed in offset parallelism with the rotational axis of the drum, a plurality of disks rigidly secured to said shaft, said disks having their faces in driving contact with adjacent pairs of spindle roller portions to rotate the same as the drum is rotated, whereby the spindles will be successively rotated as the drum is rotated.

References Cited in the file of this patent

UNITED STATES PATENTS

| | | |
|---|---|---|
| 123,704 | Irving | Feb. 13, 1872 |
| 423,541 | Todd | Mar. 18, 1899 |
| 1,219,204 | Ward | Mar. 13, 1917 |
| 1,500,992 | Irwin | July 8, 1924 |
| 1,668,247 | Morava | May 1, 1928 |
| 1,747,566 | Berry | Feb. 18, 1930 |
| 1,802,021 | Johnston et al. | Apr. 21, 1931 |
| 1,885,405 | Basquin | Nov. 1, 1932 |
| 1,942,969 | Martin | Jan. 9, 1934 |
| 2,247,682 | Hagen | July 1, 1941 |
| 2,247,686 | Johnston | July 1, 1941 |
| 2,302,180 | Brown et al. | Nov. 17, 1942 |
| 2,333,965 | Weems | Nov. 9, 1943 |